(12) United States Patent
Mantilla et al.

(10) Patent No.: US 10,999,897 B2
(45) Date of Patent: May 4, 2021

(54) INSULATION FLUID HEATING APPARATUS AND METHOD

(71) Applicant: ABB Power Grids Switzerland AG, Baden (CH)

(72) Inventors: Javier Mantilla, Baden (CH); Oliver Cossalter, Fislisbach (CH); Peter Stengard, Ludvika (SE)

(73) Assignee: ABB Power Grids Switzerland AG, Baden (CH)

( * ) Notice: Subject to any disclaimer, the term of this patent is extended or adjusted under 35 U.S.C. 154(b) by 403 days.

(21) Appl. No.: 15/948,566

(22) Filed: Apr. 9, 2018

(65) Prior Publication Data

US 2018/0295675 A1 Oct. 11, 2018

(30) Foreign Application Priority Data

Apr. 7, 2017 (EP) .................................... 17165582

(51) Int. Cl.
*A21B 2/00* (2006.01)
*H05B 3/00* (2006.01)
(Continued)

(52) U.S. Cl.
CPC .......... *H05B 3/0038* (2013.01); *G01N 21/35* (2013.01); *H01B 3/56* (2013.01); *H01H 33/22* (2013.01);
(Continued)

(58) Field of Classification Search
CPC ........ H05B 3/00; H05B 3/0038; H05B 3/008; H05B 3/009; H05B 3/10; H01B 3/56;
(Continued)

(56) References Cited

U.S. PATENT DOCUMENTS

| 3,602,669 A | 8/1971 | Meier et al. |
| 4,434,335 A | 2/1984 | Natsui et al. |

(Continued)

FOREIGN PATENT DOCUMENTS

| CN | 101285438 A | 10/2008 |
| CN | 102682957 A * | 9/2012 |

(Continued)

OTHER PUBLICATIONS

European Patent Office, Extended Search Report issued in corresponding Application No. 17165582.2, dated Sep. 27, 2017, 7 pages.

(Continued)

*Primary Examiner* — Hung D Nguyen
(74) *Attorney, Agent, or Firm* — Sage Patent Group

(57) ABSTRACT

An apparatus for heating an insulation fluid in a medium-voltage or high-voltage switchgear comprises an infrared source which is adapted to emit infrared radiation of at least one wavelength. Thus, at least one vibrational or rotational mode of at least one component of the insulation fluid is excited by absorption of at least a part of the infrared radiation, and condensation of the insulation fluid is efficiently prevented by this direct heating of the insulation fluid. A closed loop temperature regulator is used to heat only when required. A circulator in a heating chamber further provides for a mixing of the insulation fluid, thus preventing steep temperature gradients.

20 Claims, 5 Drawing Sheets

(51) Int. Cl.
  *H01H 33/56* (2006.01)
  *H02B 13/055* (2006.01)
  *H01H 33/22* (2006.01)
  *G01N 21/35* (2014.01)
  *H01B 3/56* (2006.01)

(52) U.S. Cl.
  CPC ......... *H01H 33/562* (2013.01); *H02B 13/055* (2013.01); *H05B 3/009* (2013.01); *H01H 2033/566* (2013.01)

(58) Field of Classification Search
  CPC .............. G01N 21/35; G01N 21/3504; G01N 21/3577; G01N 21/3581; G01N 21/39; H01H 33/22; H01H 33/24; H01H 33/55; H01H 33/56; H01H 33/562; H01H 33/563; H01H 33/64; H01H 33/765
  USPC .......................................... 392/407, 408, 416
  See application file for complete search history.

(56) References Cited

U.S. PATENT DOCUMENTS

| | | | |
|---|---|---|---|
| 4,698,468 A | 10/1987 | Pham | |
| 5,059,397 A * | 10/1991 | Melly | G01N 21/3504 250/343 |
| 6,147,333 A | 11/2000 | Mattson | |
| 7,102,101 B1 | 9/2006 | Johnson et al. | |
| 2006/0153986 A1* | 7/2006 | Yamamoto | C23C 14/28 427/255.6 |
| 2010/0117372 A1* | 5/2010 | McMaster | F03D 13/20 126/609 |
| 2011/0293253 A1* | 12/2011 | Zack | H05B 3/10 392/407 |
| 2015/0345831 A1* | 12/2015 | Almishari | F24S 80/20 126/714 |

FOREIGN PATENT DOCUMENTS

| | | |
|---|---|---|
| DE | 3101964 C2 | 7/1984 |
| DE | 10129747 C1 | 2/2003 |
| EP | 2893545 A1 | 7/2015 |
| FR | 2598026 B1 | 10/1987 |

OTHER PUBLICATIONS

Shimanouchi, Takehiko, Tables of Molecular Vibrational Frequencies, Part 2, U.S. Department of Commerce, National Bureau of Standards, 1967, 48 pages.

Chinese Third Office Action dated Aug. 5, 2020 for Chinese Patent Application No. 201810300043.X, 3 pages.

\* cited by examiner

INSULATION FLUID HEATING APPARATUS AND METHOD

FIELD OF THE INVENTION

The invention relates to a heating apparatus and method for use in a medium- and high-voltage switchgear to heat an insulation fluid. Further aspects of the invention relate to a medium- or high-voltage switchgear comprising such a heating apparatus and to a power transmission network comprising such a switchgear.

BACKGROUND OF THE INVENTION

Insulation fluids like $SF_6$, $CO_2$, or $C_5F_{10}O$ (C5 perfluoroketone) can be used in switchgear for, e.g., medium or high-voltage current interruption applications because of their excellent arc quenching capabilities and dielectric strengths. However, when these substances are subjected to low temperature conditions, they can begin to condensate or resublime from their gaseous into their liquid or solid forms, thereby interfering with the functionality of the switchgear due to this phase change. In other words, at low temperatures, liquefaction of the insulation fluid can occur and this diminishes the effective density of the remaining insulation fluid being still in the gaseous physical state.

In current attempts to inhibit the condensation of insulating fluids in switchgear by heating the insulation fluids to suitable levels, conventional heating technologies often utilize resistive heaters or heating blankets on an exterior side of an insulation fluid tank.

U.S. Pat. No. 6,147,333 discloses a heating blanket encircling a circuit breaker tank.

DE 101 29 747 C1 discloses a high-voltage power circuit breaker of the dead-tank type that is suitable for use at very low temperatures. To this end, the power circuit breaker is provided with a heat insulation that is embodied as a container.

U.S. Pat. No. 7,102,101 B1 discloses a high voltage circuit breaker with a tank internal heater.

DE 3101964 C2 discloses heat transfer members and tank-external electric heaters for a compressed-gas circuit interrupter.

Another known method is to collect the condensed insulation fluid, evaporate it with a heater and transfer it back to the common gas volume of the switchgear, as described, e.g., in FR 2598026 B1.

For heating up the circuit breaker tanks, U.S. Pat. No. 3,602,669 combines the use of tank-external radiant energy heaters with tank internal resistive heaters.

These known solutions suffer from the drawback, however, that they heat parts of or the complete switchgear hardware due to their indirect nature for heating the insulation fluid.

SUMMARY OF THE INVENTION

Therefore, it is an object of the invention to provide a more direct heating apparatus and method as well as a related switchgear and power transmission network.

These objects are solved by the apparatus, the method, the switchgear, and the power transmission network of the independent claims. Embodiments are given, inter alia, in dependent claims and claim combinations.

Consequently, an apparatus for heating an insulation fluid in a medium-voltage or high-voltage switchgear comprises at least one compartment for holding the insulation fluid. It should be noted here that this compartment can refer to, e.g., an encapsulation of an entire switchgear, but it can also refer to a compartment inside the switchgear itself, e.g., where separation contacts of the switchgear are located (such as e.g. in an interrupter unit of a circuit breaker). This has the effect that the insulation fluid cannot evaporate into the atmosphere, but is confined in the apparatus or the switchgear, where its insulating properties are utilized.

The insulation fluid comprises at least one component (i.e. insulation fluid component or chemical component or constituent) but can, e.g., also comprise more than one insulation fluid component such as, e.g., a carrier gas, e.g. $N_2$ and/or $CO_2$ and/or $O_2$, and a perfluoroketone C4, C5, C6, or C7.

The apparatus further comprises an infrared (IR) source, which is adapted to emit infrared radiation of at least one wavelength. This infrared radiation is suitable for excitation of at least one vibrational or rotational mode of the at least one component of the insulation fluid. Thus, radiation energy can be brought into the insulation fluid. It should be noted here that the infrared source can be an active source, like an infrared lamp or a semiconductor device, or it can be a passive source which, e.g., relies on black body radiation. Depending on the power requirements, also more than one infrared source, e.g. an array of infrared sources, can be used.

Further, the apparatus is structured such that at least a part of the infrared radiation interacts with the insulation fluid and excites the at least one vibrational or rotational mode of the at least one component of the insulation fluid. Thus, the insulation fluid is more directly heated, and condensation from the gaseous into the liquid or solid state can more efficiently be prevented. In other words, this also means that the infrared source is located directly or indirectly (e.g. via light guides) in a "line-of-sight" or field of view with at least a subvolume of the insulation fluid. It is noted here that advantageously a direct contact of an emitter of the infrared source with the insulation fluid is avoided or minimized by the use of, e.g., a protection window. Thus, putative decomposition of the insulation fluid due to the possibly very high temperatures of the emitter in the range of up to 2000 degrees Celsius is avoided.

Advantageously, the apparatus further comprises a temperature regulator, which is adapted to control an operation parameter (such as an on-off-state or an infrared radiation emission intensity) of the infrared source dependent on a temperature of the insulation fluid. For measuring this temperature, a temperature sensor in thermal contact with the insulation fluid can be present. Thus, an open-loop or closed-loop temperature control can be implemented, e.g. in a control unit of the apparatus, which switches the infrared source only on when required, e.g. due to low environmental temperatures, e.g. during winter-time or during cold-starting of the switchgear when taking into operation or after maintenance, to prevent condensation of the insulation fluid, in particular during operation of the apparatus or switchgear.

In another advantageous embodiment, the infrared source is adapted to emit not only a single infrared wavelength, but a more or less continuous spectrum of infrared radiation. Preferably, this spectrum is emitted in a wavelength regime between 1 µm and 1000 µm, more advantageously in a wavelength regime between 3 µm and 20 µm. Thus, important vibrational or rotational modes of technically significant insulation fluid components are covered. More advantageously, the apparatus comprises at least one optical filter (such as an optical low-pass filter, an optical high-pass filter, and/or an optical band-pass filter) for attenuating a part of the emitted spectrum of infrared radiation. Thus, infrared wavelengths relevant for vibrational or rotational mode-excitation can be selected from the spectrum and other "less relevant" or "irrelevant" wavelengths are only to a lower degree shone into the insulation fluid, which improves the selectivity for directly heating the insulation fluid (component).

In another advantageous embodiment, the infrared source comprises a (wavelength) tunable infrared source with a wavelength-tunable spectrum of emitted infrared radiation. Thus, infrared wavelengths relevant for vibrational or rotational mode-excitation can be selected and no other "irrelevant" wavelengths are shone into the insulation fluid, which improves the selectivity for directly heating the insulation fluid.

Advantageously, the infrared source comprises a broad band infrared source, e.g. emitting wavelengths between 0.7 µm and 25 µm, in particular between 1 µm and 20 µm, in particular between 1.5 µm and 12 µm, and/or comprises a narrow band infrared source, e.g. with a bandwidth of 3 µm, in particular 1 µm, in particular 0.8 µm. Thus, the emitted infrared radiation can be tailored to the needs for different vibrational or rotational mode-excitations which improves the selectivity for directly heating the insulation fluid.

In another advantageous embodiment, the infrared source is adapted to emit a spectrum of infrared radiation in at least two distinct wavelength regimes. This is advantageous if, e.g., multiple vibrational or rotational modes of a single or of multiple components of the insulation fluid should be excited. This improves the efficiency for directly heating the insulation fluid.

Advantageously, the apparatus further comprises a circulator for circulating the insulation fluid. This circulator can be an active circulator, e.g. based on a fan or similar, or it can be a passive circulator based on the principle of convection or similar. Thus, a more efficient mixing of the insulation fluid is ensured, which helps to prevent temperature gradients in the insulation fluid. An operation of the circulator can depend on a distribution of temperatures in the insulation fluid, which can be measured by, e.g., temperature probes in thermal contact with the insulation fluid. More advantageously, the apparatus further comprises a heating chamber, which is interconnected with the compartment. The term "interconnected" in this respect means that an insulation fluid exchange is possible between the heating chamber and the compartment. The heating chamber can also be a part of the compartment, and e.g. can be located in a lower section of the compartment, such that heated insulation fluid ascends due to its higher temperature. The infrared source can be arranged in the heating chamber, which provides the opportunity that a dedicated chamber is used for heating the insulation fluid that is then exchanged with the compartment via the interconnection.

In another advantageous embodiment, the compartment comprises at least one reflective surface for reflecting at least part of the infrared radiation. Thus, the infrared radiation is reflected, particularly multiple times, inside the compartment, which improves heating efficiency and helps to more evenly distribute the infrared radiation and therefore the heating in the insulation fluid via excitation of the vibrational or rotational mode.

Advantageously, the apparatus further comprises a light guide, such as an optical fiber for guiding at least part of the infrared radiation. Thus, the infrared source can be arranged outside the compartment, which improves accessibility, e.g. for servicing. It should be noted here that as an alternative or in addition to the light guide, the apparatus can comprise a window in the compartment, which is at least semi-transparent or transparent for at least a part of the infrared radiation. This again enables the arrangement of the infrared source outside of the compartment, and in particular allows for an infrared source to be used or designed as a mobile service tool.

In another advantageous embodiment, the insulation fluid comprises at least one insulation fluid component of the group consisting of any of the C4, C5, C6, C7 perfluoroketones, fluoronitrile and preferably perfluoronitrile, in particular heptafluoroisobutyronitrile, i.e. 2,3,3,3-tetrafluoro-2-trifluoromethyl propanenitrile alias i-C3F7CN, fluoronitrile, in particular CF3CF(OCF3)CN, 1,1,1,4,4,4-Hexafluor-2-Buten (C4H2F6), in particular cis-1,1,1,4,4,4-Hexafluor-2-Buten or trans-1,1,1,4,4,4-Hexafluor-2-Buten, general HFOs with a sum formula C3H2F4 or C3HF5, in particular HFO-1234ze, i.e. trans-1,3,3,3-tetrafluoro-1-propene, or HFO-1234yf, i.e. 2,3,3,3-tetrafluoro-1-propene, or HFO-1225ye, i.e. 1,2,2,5-pentafluoro-1-propene, general polyfluorinated oxiranes with a sum formula C4F8O, in particular polyfluorinated oxirane, i.e. 2,3-(difluoro-2,3-bis(trifluoromethyl) oxirane, hydrochlorofluoroolefin, i.e. 1-chloro-3,3,3-trifluoropropene, in particular the trans-isomer of 1-chloro-3,3,3-trifluoropropene, i.e. HCFO-1233zd, Z1336mzz, E-1438ezy, E-1233zd, isopentanes, HFCs, in particular 1,1,1,2,3,3,3-heptafluoropropane or pentafluoroethane or 1,1,1,2-tetrafluoroethane, Hexamethyldisiloxane, 2-trifluoromethyl-3-ethoxy-dodecafluorohexane (CAS: 297730-93-9), 4-trifluoromethyl-3-methoxy-decafluoropentane (CAS: 132182-92-4), hexafluoro-1,1,1,2,3,35 4-(1,1,2,3,3,3-hexafluoropropoxy) pentane (CAS: 870778-34-0), and octafluoro-2-butene (CAS number: 360-89-4).

The C4, C5, C6, and C7 perfluoroketones are defined as partially or fully fluorinated fluoroketones that have 4, 5, 6, or 7 interconnected carbon atoms, respectively. For example, WO 2010/142346 A1 provides details on this.

In particular, the term "fluoroketone" as used in the context of the present invention shall be interpreted broadly and shall encompass both fluoromonoketones and fluorodiketones or generally fluoropolyketones. Explicitly, more than a single carbonyl group flanked by carbon atoms may be present in the molecule. The term shall also encompass both saturated compounds and unsaturated compounds including double and/or triple bonds between carbon atoms. The at least partially fluorinated alkyl chain of the fluoroketones can be linear or branched and can optionally form a ring.

In embodiments, the insulation fluid comprises at least one insulation fluid component being a fluoroketone, which may optionally comprise also heteroatoms incorporated into the carbon backbone of the molecules, such as at least one of: a nitrogen atom, oxygen atom and sulphur atom, replacing a corresponding number of carbon atoms. More preferably, the fluoromonoketone, in particular perfluoroketone, can have from 3 to 15 or from 4 to 12 carbon atoms and particularly from 5 to 9 carbon atoms. Most preferably, it may comprise exactly 4 carbon atoms and/or exactly 5 carbon atoms and/or exactly 6 carbon atoms and/or exactly 7 carbon atoms and/or exactly 8 carbon atoms.

In more general terms, the insulation fluid comprises an organofluorine compound, such organofluorine compound being selected from the group consisting of: a fluoroether, an oxirane, a fluoroamine, a fluoroketone, a fluoroolefin, a fluoronitrile, and mixtures and/or decomposition products thereof. Herein, the terms "fluoroether", "oxirane", "fluoroamine", "fluoroketone", "fluoroolefin", and "fluoronitrile" refer to at least partially fluorinated compounds.

This leads to better dielectric strength and/or arc quenching capabilities compared to, e.g., having solely CO2 or N2 in the fluid.

As another aspect of the invention, a switchgear comprises an apparatus as described above. Thus, condensation of the insulation fluid of the switchgear is more efficiently prevented, which leads to higher reliability under wider (i.e. more versatile and in particular harsher) environmental conditions. In particular, the switchgear is selected from the group consisting of: a busbar, a bushing, a cable, a cable joint, a current transformer, a voltage transformer, a sensor, a humidity sensor, a surge arrester, a capacitor, an inductance, a resistor, an insulator, a current limiter, a high voltage switch, an earthing switch, a disconnector, a combined disconnector and earthing switch, a load-break switch, a circuit breaker, a generator circuit breaker, a medium voltage switch, a ring main unit, a recloser, a sectionalizer, a low voltage switch, a gas-insulated switch, a transformer, a distribution transformer, a power transformer, a tap changer, a transformer bushing, a electrical rotating machine, a generator, a motor, a drive, a semiconducting device, a computing machine, a power semiconductor device, a power converter, a converter station, a convertor building, and a component and/or combination of such devices.

Advantageously, the infrared source is arranged at an inside of a cover of the switchgear, which enables a simpler design while good optical contact with the insulation fluid is facilitated.

As another aspect of the invention, a power transmission network comprises a switchgear as described above. Because condensation of the insulation fluid of the switchgear is more efficiently prevented by means of a heating apparatus as discussed above, the power transmission network has a higher reliability under wider environmental conditions, such as low-temperature conditions, e.g. during a winter period.

As yet another aspect of the invention, a method for heating an insulation fluid in a medium-voltage or high-voltage switchgear by means of an apparatus as describe above comprises a step of
by means of an infrared source of the apparatus emitting infrared radiation of at least one wavelength and thereby exciting at least one vibrational or rotational mode of at least one component of the insulation fluid. Thus, the insulation fluid is more directly heated and condensation from the gaseous into the liquid state can more efficiently be prevented.

BRIEF DESCRIPTION OF THE FIGURES

The invention will be better understood and objects other than those set forth above will become apparent when consideration is given to the following detailed description thereof. This description makes reference to the annexed drawings, wherein.

DETAILED DESCRIPTION

Solution, Methods, Physical and Chemical Principles
IR Spectroscopy
IR spectroscopy is a very common analytical method used in chemistry to help to characterize the structure of a desired molecule. It is important to understand the underlying physical conventions that make up IR spectroscopy in order to fully understand how radiant heating applications work. In principle, electromagnetic radiation in the IR range is emitted from a source and travels at the speed of light c. These electromagnetic waves are often characterized by frequency $v$ or wavelength $\lambda$ which are related by the equation $c=v\lambda$. Furthermore, the frequency of the emitted wave is directly proportional to its energy, as shown in Planck's Law, $E=hv$, where h is Planck's constant. This equation can also be rearranged to show that wavelength and energy are inversely proportional as $E=hc/\lambda$. Moreover, $E\alpha v$ and $E\alpha 1/\lambda$. Infrared radiation extends from wavelengths of 700 nm to 1 mm, corresponding to 1.99e−13 and 2.72e−19 Joules (i.e. photon energy), respectively.

Figure 1:
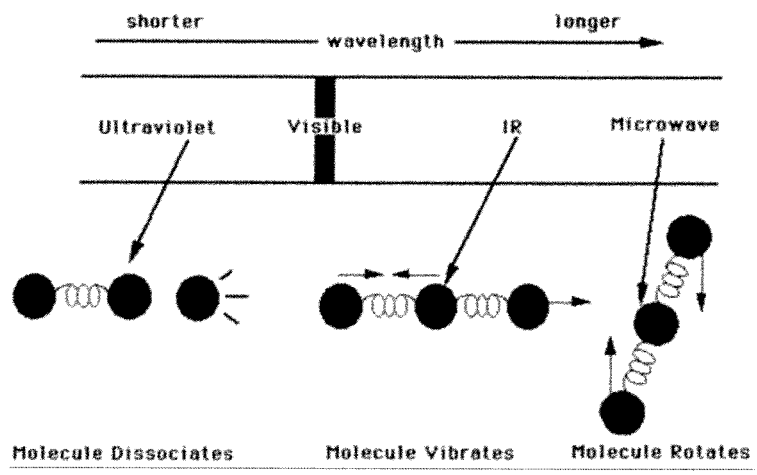
FIG. 1 shows molecular responses to radiation in the UV, IR, and Microwave electromagnetic regions for a simple linear three atom molecule.

Photons emitted in the IR region can be absorbed by molecules in the form of vibrational energy. That is, IR radiation is able to excite vibrations in molecules in their ground state (most stable energy state). This means that the configuration of each molecule remains unchanged upon IR exposure, as opposed to higher energy radiation (i.e. UV, X-ray) where the electrons of the molecules are excited to higher energy states, which may result in ionization. Lower energy radiation (i.e. Microwave radiation) cannot excite electrons or vibrations in molecules, as it can only cause molecules to rotate. This concept is illustrated in FIG. 1.

Gaseous mixtures are not black bodies, meaning that they are not able to absorb all ranges of electromagnetic radiation. Atoms and molecules are restricted to the specific energies at which they have the ability to absorb energy in the form of electromagnetic radiation. This is because the specific resonant frequencies at which a specific molecule can vibrate are quantized. Moreover, only certain energies for the system are allowed and only photons with certain energies have the ability to excite molecular vibrations through molecular absorption. These restrictions are based on the structure of the molecule itself and the functional groups that it contains. There are some general trends in molecular responses to radiation. For example, stronger bonds such as double and triple bonds require more energy to excite a vibration, as opposed to a single bond, and will resonate at higher frequencies. Additionally, the heavier an atom, the lower the vibrational frequencies, that involve that atom, will be. A structure of a molecule also dictates the number of different types of vibrations (vibrational modes) that are possible at specific energies. Molecular vibrations can occur in the form of stretching, bending, rocking, twisting, etc. However, in order for a specific vibrational mode to be IR active (the absorption of an IR photon to excite the vibration is allowed by the rules of quantum mechanics), it must involve a change of the dipole moment. The intensity of this dipole change dictates the amount of energy that is able to be absorbed. In terms of the IR absorbance spectrum for the molecule, larger and sharper peaks are associated with larger dipole changes and vice-versa for smaller dipole changes.

Radiant Heating

The fundamental principles and information provided through IR spectroscopy are useful in further applications. Radiant heating technologies utilize the transfer of electromagnetic radiation between molecules to raise the temperature of a chemical medium and its surroundings. The concept utilizes the principle that molecules are able to absorb electromagnetic waves to excite vibrations in them. The severity of the vibrational motion that is induced on a molecule (increase in kinetic energy), for example through the absorption of electromagnetic energy, is what we refer to as temperature or heat. Furthermore, absolute zero (0 Kelvin) is the temperature at which there is no vibrational motion occurring within the molecules present. On the other hand, stronger molecular vibrations correlate with a greater temperature increase.

Gaseous Mixtures IR Absorption Data

Infrared absorption data for the gaseous insulation fluids used in medium- or high-voltage switchgear applications are provided below. The IR absorption data is given for the purpose of determining the necessary spectral emission characteristic of the infrared source of the heating apparatus (see below).

SF6

Figure 2A:
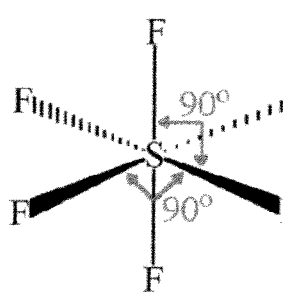
FIG. 2a shows the molecular structure of SF6.

SF6 is an octahedral shaped molecule with six identical S—F bonds. The molecular structure of SF6 is shown in FIG. 2a. Each F—S—F bond is at a bond angle of 90°, thus making the molecule completely symmetrical. This symmetry enables each of the bond dipoles to cancel each other out which results in there being no molecular dipole moment for SF6 in its ground state. The dashes and wedges in FIG. 2a represent a plane that is perpendicular to the page. The dashed lines imply that the bonds are going into the page, while the wedges are coming out towards the viewer. Each S—F bond has an identical dipole in the direction of the bond.

Figure 2B:
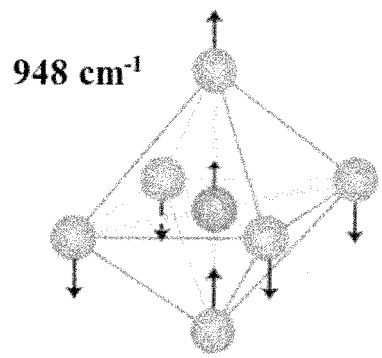
FIG. 2b shows IR active vibrational modes for SF6 together with the corresponding wavenumbers.
Figure 2B:
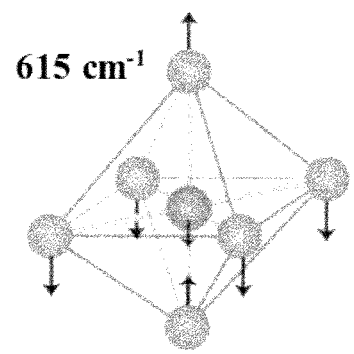

There are only two possible vibrational modes for SF6 that result in the change of the molecular dipole (i.e. that are IR active). They are shown in FIG. 2b together with their corresponding wavenumbers that induce these vibrations.

From this information two distinct peaks in the IR absorption spectrum of SF6 are identified. However, the intensity of the two peaks is different since the new dipoles that these vibrations induce differ in the intensity or magnitude of polarity. The peak at a wavenumber of 948 cm-1 is more intense than the peak at 615 cm-1, because the new dipole is more intense at 948 cm-1.

Figure 2C:
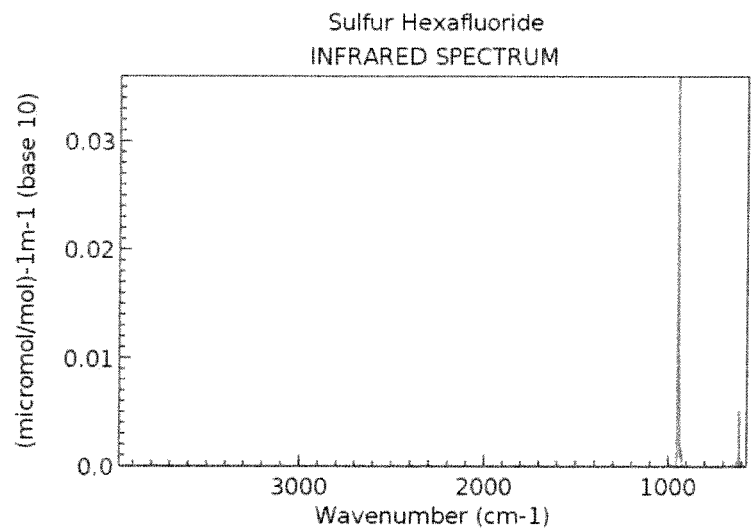
FIG. 2c shows IR absorption spectrum for SF6.

The IR absorption spectrum for SF6 is shown in FIG. 2c. In this Figure, the wavenumber on the x-axis is the number of waves per centimeter, while the y-axis is analogous to the amount of absorption.

CO2/O2

Figure 3A:
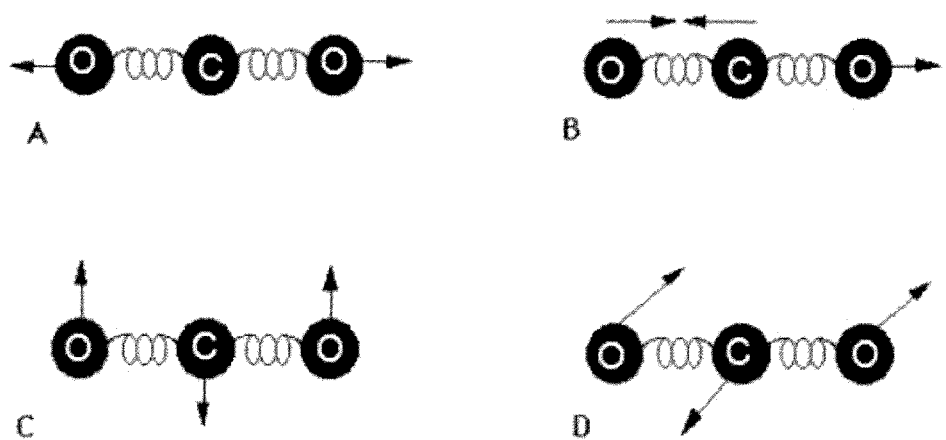
FIG. 3a shows the vibrational modes of CO2.

Insulating fluid mixtures of CO2/O2 are in embodiments present in 9:1 mixing ratios. Since there are no polar bonds in O2, it cannot absorb radiation in the infrared region and thus won't be effected by this process. For this reason, CO2 should be the focus for heating this mixture. This section focuses on the IR absorbance data for pure CO2. There are four different types of vibrations that can occur in a CO2 molecule. The vibrational modes for CO2 are illustrated in FIG. 3a. FIG. 3a(A) represents a symmetric stretch where the two oxygen molecules are in phase with each other. FIG. 3a(B) represents an asymmetric stretch where the two oxygen molecules are out of phase with each other. FIG. 3a(C)&(D) are bending modes of equal energy and they only differ by the plane in which they are bending. Only B, C, & D are IR active vibrational modes.

Figure 3B:
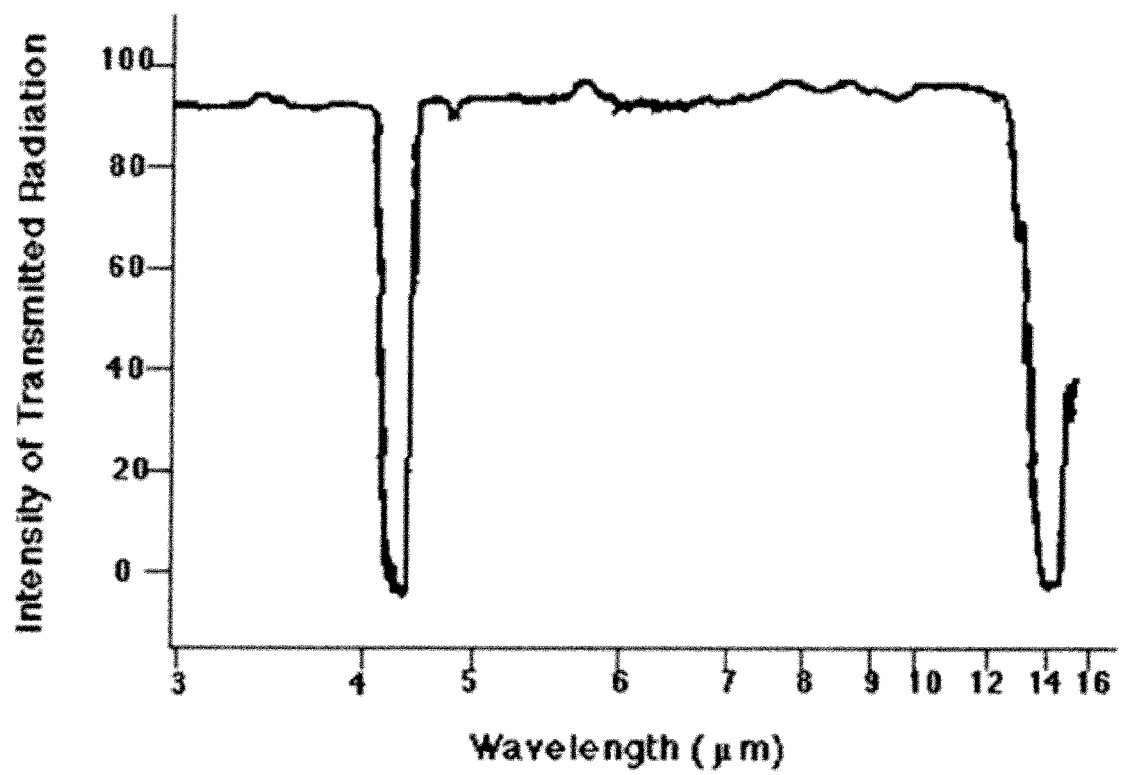
FIG. 3b shows the IR transmission spectrum for CO2.

Even though there are 4 distinct vibrational modes in CO2, only the asymmetric (B) and bending (C&D) modes are able to be observed in the IR spectrum. This is because there is a change in the molecular dipole moment when the B, C, or D vibrations occur. The greater the dipole change is, the greater the IR absorbance intensity will be. This fact makes compounds that contain carbonyls (C=O), for example in Ketones, very distinguishable on an IR spectra through sharp and broad absorption peaks. These strong and broad peaks on an IR spectrum tell us that a majority of the transmitted radiation is absorbed by the molecule at a specific energy or wavelength depending on the other intramolecular forces present. The IR spectrum of CO2 is shown in FIG. 3b. Here, the x-axis represents the range of wavelengths emitted from the IR radiation source. The y-axis represents the percentage of the emitted radiation that is transmitted to the detector rather than being absorbed by the sample of CO2. The absorption peak (i.e. transmission dip) at ~4.25 μm is from the asymmetric stretch (B in FIG. 3a), and the peak (i.e. transmission dip) at ~15 μm corresponds to both of the bending vibrations (C & D in FIG. 3a).

Preferred Insulation Fluid with C5F10O Perfluoroketone

Figure 4A:
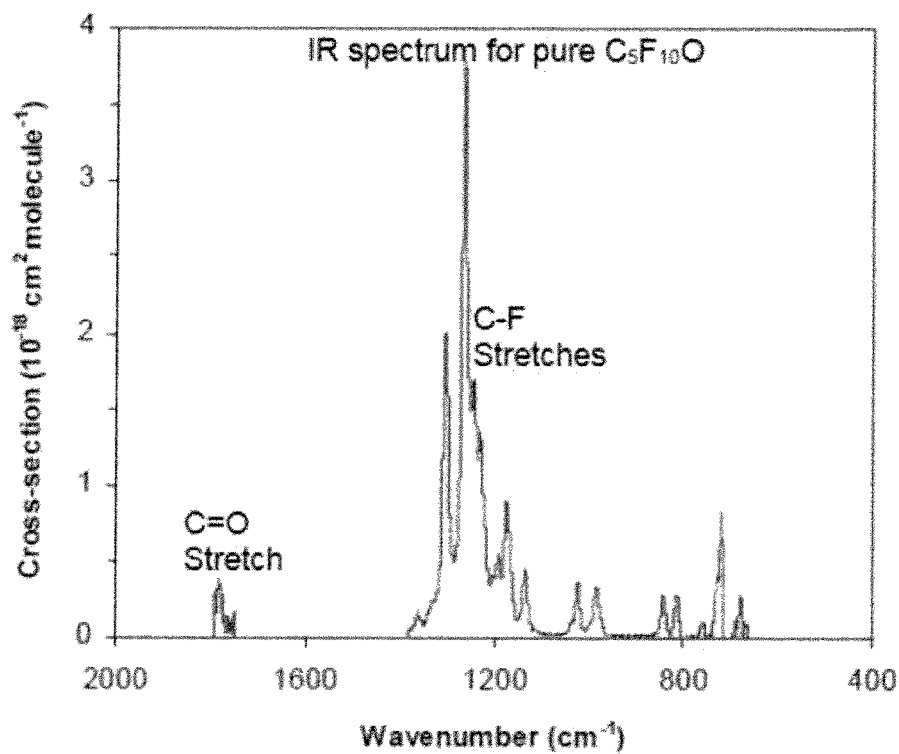
FIG. 4a shows the IR absorption spectrum for pure C5.

This refers to a mixture of CO2, O2, and C5F10O (C5). The focus in this section is on how to excite vibrations in the C5 perfluoroketone. The C5 is more complicated in terms of its IR absorbance because of the size and complexity of the molecule. There are many different vibrational modes within the molecule, 42 to be exact. However, since many of the bonds within the molecule are similar, there are some ranges of overlap in the wavelengths of radiation that it can absorb. The IR data for pure C5 is shown in FIG. 4a. (Effective) Cross-section is a method of quantifying absorption that takes into account the cross sectional area of the IR beam in relation to the cross sectional area of the molecules in the sample. For C5, the C—F stretches are shown to peak in their absorbance ability between 1400-1000 cm-1 (7 μm and 9 μm). The C=O stretch, on the other hand, shows up at 1800 cm-1 (5.6 μm). However, since there is only one C=O bond in a C5 molecule, there is a smaller chance that it will be able to absorb the radiation due to steric effects from the larger and more plentiful Fluorine atoms blocking and scattering the light before reaching the ketone (i.e. carbonyl group).

Figure 4B:
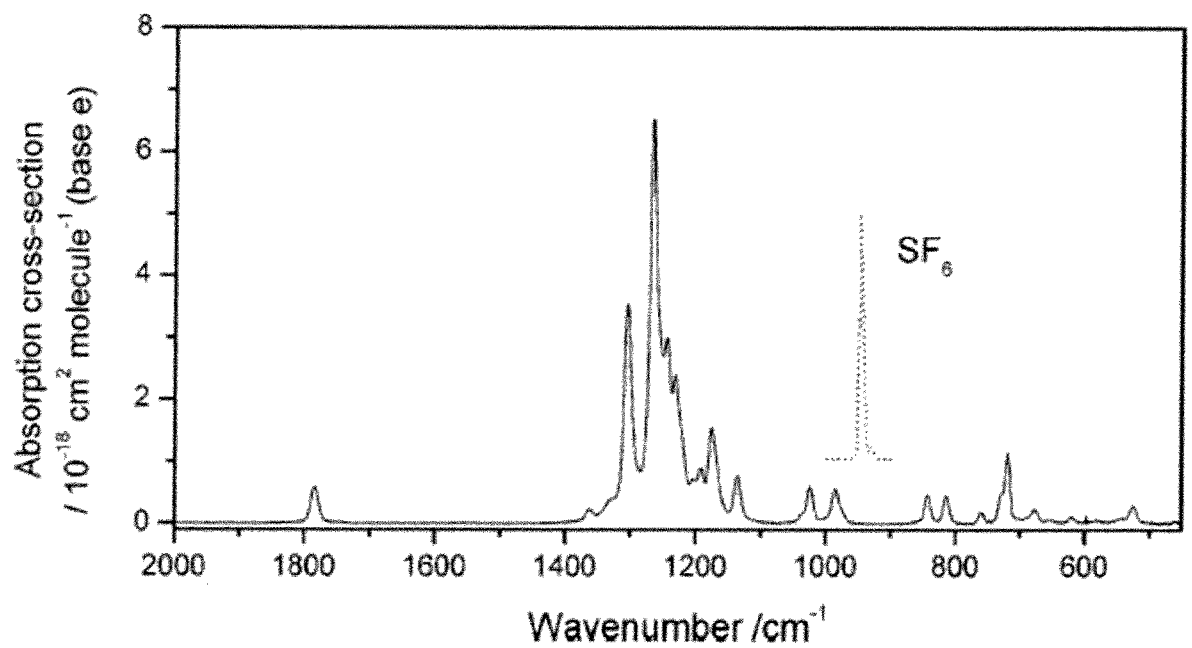
FIG. 4b shows the IR absorption spectrum for C6.

FIG. 4b shows the IR absorption cross section of C6 which looks very similar to the spectrum for C5 shown in FIG. 4a. The SF6 absorption peak as discussed in FIG. 2c is shown for comparison.

It is noted that many of the other substances relevant for insulation fluids comprise CF3 or CF2 groups. These groups contribute significantly to the absorption in the IR range (vibrational modes). For all substances, the required IR spectra of interest can be readily found in literature, e.g. in "Tables of Molecular Vibrational Frequencies", 1967, by Takehiko Shimanouchi of University of Tokyo. If this should not be the case for a specific substance, the skilled person readily knows how to measure the absorption spectrum using IR spectroscopy techniques.

Apparatus

Figure 5:
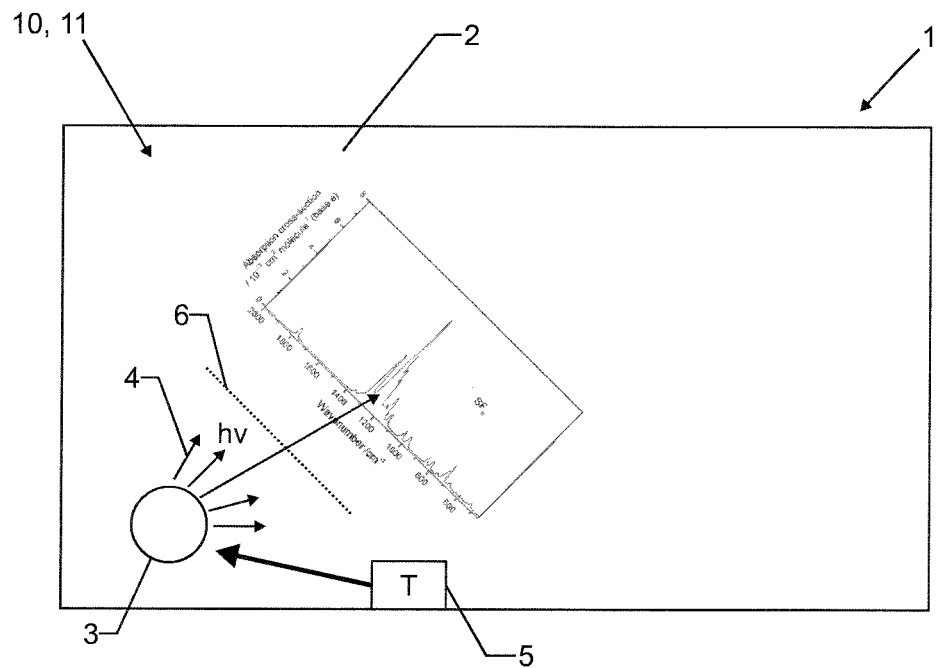
FIG. 5 shows a first embodiment of an apparatus 1 according to the invention, the apparatus 1 comprising an IR source 3 in a compartment 2, a temperature regulator 5, and an optical filter 6.

As a method or device for avoiding condensation of insulation fluids in medium or high-voltage switchgear, FIG. 5 shows a first embodiment of an apparatus 1 according to the invention. The apparatus 1 comprises a compartment 2 with the insulation fluid 10 CO2—O2—C5F10O with an insulation fluid component 11 C5 (see above). An infrared (IR) source 3 is arranged in the compartment 2 and emits a broad band IR radiation 4 between 1 µm and 1000 µm (labelled "hv"). This IR radiation is spectrally shaped by an optical band pass filter 6 that substantially lets only pass IR radiation in the C5 absorption peak between 7 µm and 9 µm (see above). Thus, the CF-stretches as vibrational or rotational modes of the insulation fluid component 11 C5 are excited when the IR source is on, and thus the insulation fluid 10 is directly heated via radiant heating as described above. A temperature regulator 5 controls an on-off state as well as an IR intensity of the IR source 3 in a closed loop PID control scheme as known to the skilled person. Thus, condensation of the insulation fluid 10 is effectively prevented and energy (e.g. for previously known conventional heating) is saved.

Figure 6:
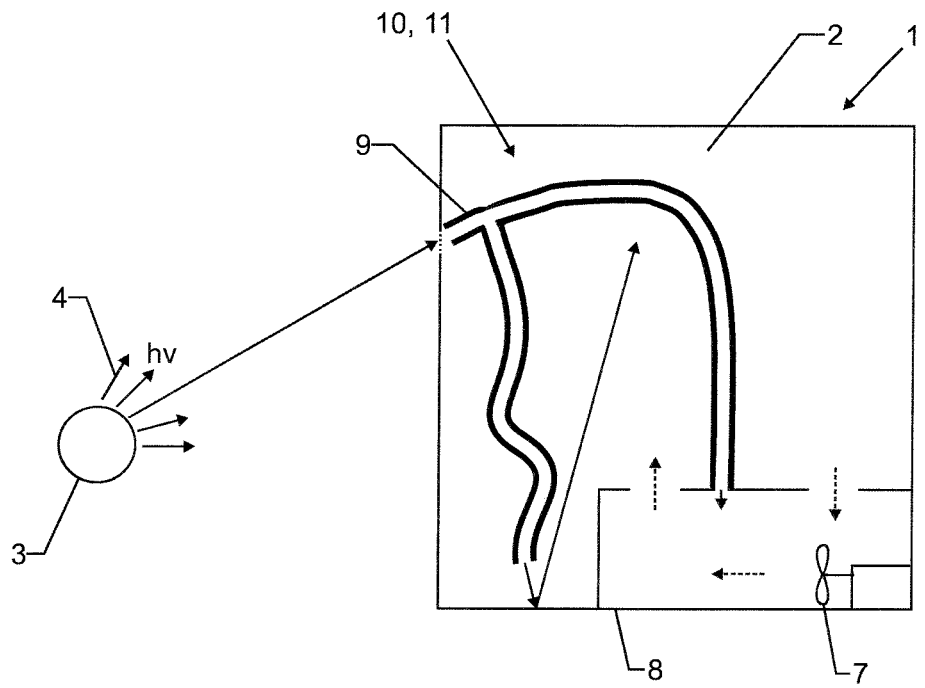
FIG. 6 shows a second embodiment of an apparatus 1 according to the invention, the apparatus 1 comprising an IR source 3 outside of a compartment 2, a light guide 9, and a circulator 7 for the dielectric insulation medium in a heating chamber 8 (i.e. separate chamber 8 dedicated for heating or reheating the dielectric insulation medium)

FIG. 6 shows a second embodiment of an apparatus 1 according to the invention. This embodiment pretty much resembles the first embodiment described above under FIG. 5 with the differences that the IR source 3 is a wavelength tunable IR source emitting between 7 µm and 9 µm only (thus making the optical filter unnecessary) and that the IR source 3 is arranged outside of the compartment 2. Further, IR radiation is shone into the compartment 2 via a window (dotted line) and guided by a light guide 9 to a location inside the compartment 2, preferably vis a vis a reflective inside surface of the compartment 2 (bottom). Here, a part of the IR radiation 4 is reflected and thereby heats the adjacent insulation fluid 10 (only schematically shown with one reflection). Another part of the IR radiation 4 is guided to a heating chamber 8 with a circulator-fan 7 for heating the insulation fluid 10 in there. An insulation fluid 10 exchange between the heating chamber 7 and the compartment 2 is provided via fluid interconnections (schematically shown as dashed arrows).

Thus in particular, the light guide 9 for guiding at least part of the infrared radiation 4 is designed for at least one of: guiding infrared radiation 4 into the compartment 2, guiding infrared radiation 4 inside the compartment 2, guiding infrared radiation 4 to a location inside the compartment 2. Preferably the location is selected to be at least one of: a heating chamber 8 for the insulation fluid 10, a reflecting wall of the compartment 2, a reflecting wall of the heating chamber 8.

Figure 7:
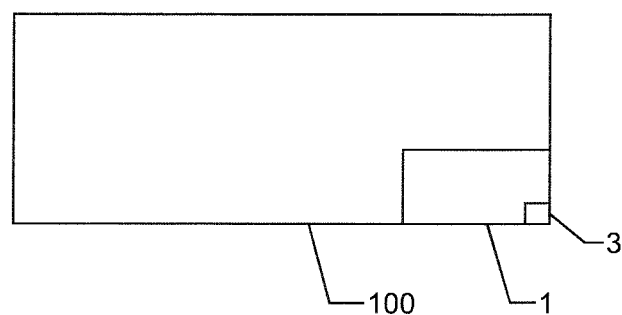
FIG. 7 shows a switchgear 100 according to the invention, the switchgear 100 comprising an apparatus 1 according to the invention disclosed herein.

As another aspect of the invention, FIG. 7 shows a switchgear 100 according to the invention, wherein the switchgear 100 comprises an apparatus 1 as described above. As a difference to the embodiments discussed above, the apparatus 1 here comprises an IR source 3, which is adapted to emit a spectrum of IR radiation in at least two distinct wavelength regimes, i.e between 7 µm and 9 µm for heating CF stretches of C5 as discussed above and around 15 µm for being absorbed in the bending vibrations of CO2 in an CO2—O2—C5F10O insulation fluid 10. Thus, a concurrent excitation of CO2 and C5 is enabled which increases radiant heating performance. Furthermore, the IR source 3 is arranged at an inside of a cover of the switchgear 100 to facilitate serviceability. Optionally, the IR source 3 can be adapted to furthermore emit IR radiation at around 4.25 µm for exciting the asymmetric stretch in the CO2 molecules (not shown).

Figure 8:
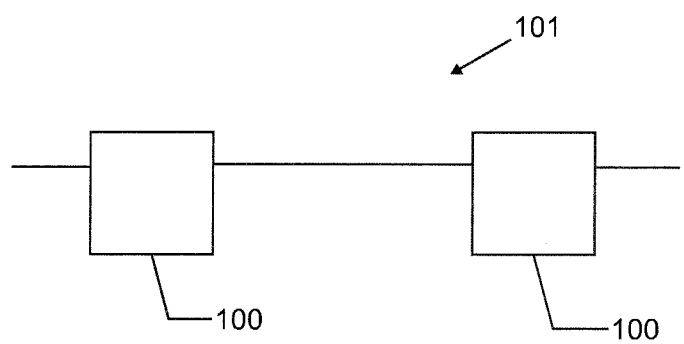
FIG. 8 shows a power transmission network 101 according to the invention, the power transmission network 101 comprising two switchgears 100 according to the invention disclosed herein.

As yet another aspect of the invention, FIG. 8 shows a power transmission network 101 according to the invention. The power transmission network 101 comprises e.g. two circuit breakers 100 with apparatuses 1 as described above. Thus, the fail safe operation of the power transmission network can be ensured even in low temperature environmental conditions.

Notes

Spectral Manipulation

Spectral manipulation of the IR source 3 and the IR radiation 4, respectively, is advantageously addressed in order for the apparatus to be as efficient as possible in radiant heating the insulation fluid 10 and keeping energy requirements and cost at a minimum. This means that the IR source 3 is adjusted to substantially only emit IR radiation 4 within the specific range of wavelengths that will result in the greatest absorbance from the molecules or components 11 present in the insulation fluid 10. Any radiation that is emitted at wavelengths outside of the optimum absorption regime or range of the insulation fluid will not be harmful to the heating process, but is mainly unused and wasted energy. It furthermore indirectly heats the whole switchgear 100, which can be disadvantageous in specific situations. The optimum absorbance ranges will be different for each insulation fluid 10 mixture based on its chemical composition, i.e. its insulation fluid component(s) 11. An IR absorption analysis is therefore conducted for each insulation fluid 10 mixture and the IR spectrum is studied to determine the most efficient emission wavelength of the IR source 3.

As examples, for SF6, an IR source 3 that emits radiation at wavelengths from 10 µm-18 µm is suitable. Also, since the greatest absorbance occurs at 10 µm, an IR source that emits at 10 µm+1 µm also works.

For CO2, the two absorbance peaks exist at opposite ends of the spectrum. This phenomenon brings about a few options for spectral manipulation of the IR source in order to minimize power input. One option is to have one broad IR source 3 that emits wavelengths from 4 µm to 15 µm. The alternative and more efficient option is to use two separate IR source with distinct spectra: one that emits radiation at wavelengths between 4 µm to 5 µm and another at 13 µm to 15 µm. Yet another option would be to only use one IR source 3 that only focuses on one of the vibrations rather than both.

For C5, it is ideal to focus on emitting radiation at the wavelengths that excite the C—F stretches, since the C═O stretch is weaker as discussed above. An IR source 3 that emits radiation between 7.1 µm to 10 µm is suitable for this application. For this, e.g., a narrow band IR source with a bandwidth of 3 µm is suitable.

A narrow band IR source with a bandwidth of 2 µm centered around 5 µm can excite CO2 and C5 at the same time.

The energy input and power required, depends on each application and depends on the delta T to be covered that can vary from application to application and also depends on the environmental conditions expected. As an example, in a specific embodiment, a heating power of 140 W was required to heat up from −5 degrees C. to +5 degrees C.

LIST OF REFERENCE NUMBERS

1: apparatus
2: compartment
3: infrared source
4: infrared radiation
5: temperature regulator
6: optical filter
7: circulator, fan
8: heating chamber for insulation fluid
9: light guide
10: insulation fluid
11: insulation fluid component
100: switchgear
101: power-transmission network

SUMMARY OF A PREFERRED EMBODIMENT

An apparatus 1 for heating an insulation fluid 10 in a medium-voltage or high-voltage switchgear 100 comprises an infrared source 3 which is adapted to emit infrared radiation 4 of at least one wavelength. Thus, at least one vibrational or rotational mode of at least one component 11 of the insulation fluid 10 is excited by absorption of at least a part of the infrared radiation 4 and condensation of the insulation fluid 10 is efficiently prevented by this direct heating of the insulation fluid 10. A closed loop temperature regulator 5 is used to heat only when required. A circulator 7 in a heating chamber 8 for the insulation fluid further provides for a mixing of the insulation fluid 10, thus preventing steep temperature gradients.

DEFINITIONS

The term "fluid" relates to "a substance, such as a liquid [and/] or gas, that can flow, has no fixed shape, and offers little resistance to an external stress" (from http://www.thefreedictionary.com/fluid, accessed on 14 Feb. 2017).

The term "medium-voltage" as used herein refers to AC or DC voltages in the range of 1 kV to 72 kV. The term "high-voltage" relates to AC or DC voltages larger than 72 kV.

While there are shown and described presently preferred embodiments of the invention, it is to be distinctly understood that the invention is not limited thereto but may be otherwise variously embodied and practiced within the scope of the following claims.

The invention claimed is:

1. An apparatus for heating an insulation fluid in a medium-voltage or high-voltage switchgear, wherein the insulation fluid comprises at least one component, the apparatus comprising:
a compartment for holding the insulation fluid, and
an infrared source adapted to emit infrared radiation of at least one wavelength for excitation of at least one vibrational or rotational mode of the at least one component of the insulation fluid, wherein the apparatus is structured such that at least a part of the infrared radiation interacts with the insulation fluid and excites the at least one vibrational or rotational mode of the at least one component of the insulation fluid.

2. The apparatus of claim 1, further comprising a temperature regulator configured to control an operation parameter of the infrared source as a function of a temperature of the insulation fluid.

3. The apparatus of claim 2, wherein the infrared source is configured to emit a spectrum of infrared radiation in a wavelength regime between 1 µm and 1000 µm.

4. The apparatus of claim 1, wherein the infrared source is configured to emit a spectrum of infrared radiation, in a wavelength regime between 1 µm and 1000 µm.

5. The apparatus of claim 4, further comprising an optical filter configured to attenuate a part of the emitted spectrum of infrared radiation that is less relevant for vibrational or rotational mode excitation of the at least one component of the insulation fluid than the at least one wavelength.

6. The apparatus of claim 1, wherein the infrared source comprises a tunable infrared source with a wavelength-tunable spectrum of emitted infrared radiation.

7. The apparatus of claim 1, wherein the infrared source comprises a narrow band infrared source, the insulation fluid comprising CO2 and C5 perfluoroketone, and the infrared source configured to emit a wavelength at 5 µm with a bandwidth of 2 µm.

8. The apparatus of claim 1, wherein the infrared source is configured to emit a spectrum of infrared radiation in at least two distinct wavelength regimes, wherein each distinct wavelength regime is configured to excite at least one vibrational or rotational mode of a respective distinct component of the insulation fluid.

9. The apparatus of claim 1, further comprising:
a heating chamber interconnected with the compartment; and
a circulator configured to circulate the insulation fluid between the compartment and the heating chamber.

10. The apparatus of claim 9, wherein the infrared source is arranged inside the heating chamber.

11. The apparatus of claim 1, wherein the compartment comprises at least one reflective surface configured to reflect at least part of the infrared radiation.

12. The apparatus of claim 1, further comprising a light guide configured to guide at least part of the infrared radiation.

13. The apparatus of claim 12, wherein the light guide is configured for at least one of: guiding infrared radiation into the compartment, guiding infrared radiation inside the compartment, or guiding infrared radiation to a location inside the compartment.

14. The apparatus of claim 1, wherein
the insulation fluid comprises SF6 and the infrared source emits a wavelength in a range from 10 µm to 18 µm;
the insulation fluid comprises CO2 and the infrared source emits a wavelength in a range from 4 µm to 15 µm; and
the insulation fluid comprises C5 and the infrared source emits a wavelength in a range from 7.1 µm to 10 µm.

15. The apparatus of claim 1, wherein the insulation fluid comprises at least one insulation fluid component of the group consisting of:
any of the C4, C5, C6, C7 perfluoroketones,
fluoronitrile, in particular heptafluoroisobutyronitrile, i.e. 2,3,3,3-tetrafluoro -2-trifluoromethyl propanenitrile alias i-C3F7CN,
fluoronitrile, in particular CF3CF(OCF3)CN,
1,1,1,4,4,4-Hexafluor-2-Buten (C4H2F6), in particular cis -1,1,1,4,4,4-Hexafluor -2-Buten or trans-1,1,1,4,4, 4-Hexafluor-2-Buten, general HFOs with a sum formula C3H2F4 or C3HF5, in particular HFO-1234ze, i.e. trans-1,3,3,3-tetrafluoro-1-propene, or HFO-1234yf, i.e. 2,3,3,3-tetrafluoro-1-propene, or HFO-1225ye, i.e. 1,2,2,5-pentafluoro-1-propene, general polyfluorinated oxiranes with a sum formula C4F8O, in particular polyfluorinated oxirane, i.e. 2,3-(difluoro-2,3-bis(trifluoromethyl) oxirane, hydrochlorofluoroolefin, i.e. 1-chloro-3,3,3-trifluoropropene, Z1336mzz, E-1438ezy, E-1233zd, isopentanes, HFCs, Hexamethyldisiloxane, 2-trifluoromethyl-3-ethoxy-dodecafluorohexane (CAS: 297730-93-9), 4-trifluoromethyl-3-methoxy-decafluoropentane (CAS: 132182-92-4), hexafluoro-1,1,1,2,3,35 4-(1,1,2,3,3,3-hexafluoropropoxy) pentane (CAS: 870778-34-0), and octafluoro-2-butene (CAS number: 360-89-4).

16. The apparatus of claim 1, further comprising a switchgear comprising the compartment and the infrared source, wherein the switchgear is selected from the group consisting of: a busbar, a bushing, a cable, a cable joint, a current transformer, a voltage transformer, a sensor, a humidity sensor, a surge arrester, a capacitor, an inductance, a resistor, an insulator, a current limiter, a high voltage switch, an earthing switch, a disconnector, a combined disconnector and earthing switch, a load-break switch, a circuit breaker, a generator circuit breaker, a medium voltage switch, a ring main unit, a recloser, a sectionalizer, a low voltage switch, a gas-insulated switch, a transformer, a distribution transformer, a power transformer, a tap changer, a transformer bushing, an electrical rotating machine, a generator, a motor, a drive, a semiconducting device, a computing machine, a power semiconductor device, a power converter, a converter station, and a convertor building.

17. The apparatus of claim 16 wherein the infrared source is arranged at an inside of a cover of the switchgear.

18. The apparatus of claim 16, further comprising a power transmission network, wherein the switchgear is part of the power transmission network.

19. The apparatus of claim 1, wherein the infrared source is configured to emit a spectrum of infrared radiation in a wavelength regime between 3 µm and 20 µm.

20. The apparatus of claim 1, wherein the wavelength is selected based on the interaction between the part of the infrared radiation and at least one component of the insulation fluid.

* * * * *